United States Patent
Krzyzanowski et al.

(10) Patent No.: US 8,706,818 B2
(45) Date of Patent: Apr. 22, 2014

(54) REMOTE CONTROL-BASED INSTANT MESSAGING

(75) Inventors: Paul Krzyzanowski, Flemington, NJ (US); Justin Flores, Delray Beach, FL (US)

(73) Assignee: Microsoft Corporation, Redmond, WA (US)

( * ) Notice: Subject to any disclaimer, the term of this patent is extended or adjusted under 35 U.S.C. 154(b) by 1346 days.

(21) Appl. No.: 11/641,101

(22) Filed: Dec. 19, 2006

(65) Prior Publication Data
US 2008/0147803 A1    Jun. 19, 2008

(51) Int. Cl.
*G06F 15/16* (2006.01)

(52) U.S. Cl.
USPC ............................ 709/206; 709/205; 709/217

(58) Field of Classification Search
USPC ........................... 709/203, 204, 205, 217, 206
See application file for complete search history.

(56) References Cited

U.S. PATENT DOCUMENTS

| | | | |
|---|---|---|---|
| 6,757,365 B1 | 6/2004 | Bogard | |
| 6,763,226 B1 * | 7/2004 | McZeal, Jr. | 455/90.2 |
| 7,281,215 B1 * | 10/2007 | Canfield et al. | 715/752 |
| 7,516,411 B2 * | 4/2009 | Beaton et al. | 715/753 |
| 7,519,912 B2 * | 4/2009 | Moody et al. | 715/753 |
| 7,877,697 B2 * | 1/2011 | Canfield et al. | 715/753 |
| 7,917,583 B2 * | 3/2011 | Angiolillo et al. | 709/204 |
| 7,921,368 B2 * | 4/2011 | Moody et al. | 715/751 |
| 8,060,624 B1 * | 11/2011 | McKinney et al. | 709/228 |
| 2005/0086211 A1 * | 4/2005 | Mayer | 707/3 |
| 2005/0165880 A1 | 7/2005 | Moody et al. | |
| 2005/0262542 A1 * | 11/2005 | DeWeese et al. | 725/106 |
| 2005/0278427 A1 | 12/2005 | Danker et al. | |
| 2006/0036703 A1 | 2/2006 | Fulmer et al. | |
| 2006/0041923 A1 | 2/2006 | McQuaide, Jr. | |
| 2006/0070003 A1 * | 3/2006 | Thompson et al. | 715/758 |
| 2006/0149818 A1 * | 7/2006 | Odell et al. | 709/206 |
| 2006/0174010 A1 * | 8/2006 | Deshpande | 709/227 |
| 2006/0174207 A1 * | 8/2006 | Deshpande | 715/758 |

(Continued)

FOREIGN PATENT DOCUMENTS

| | | |
|---|---|---|
| CN | 1794308 A | 6/2006 |
| EP | 1 686 747 A1 | 8/2006 |

(Continued)

OTHER PUBLICATIONS

International Search Report for Appl. No. PCT/US07/25782 completed Mar. 22, 2008 and issued Apr. 17, 2008, 2 pages.

(Continued)

*Primary Examiner* — Kristie Shingles
(74) *Attorney, Agent, or Firm* — Micah Goldsmith; Leonard Smith; Micky Minhas

(57) ABSTRACT

Systems and methods for instant messaging remote control are disclosed. An instant messaging remote control includes an audio/visual remote control, an instant messaging user interface, an instant messaging navigator, a keypad and an integrated messaging/remote control application module. The instant messaging user interface enables a user to view instant messaging status and control instant messaging functions. The instant messaging navigator enables a user to switch between instant messaging sessions. The integrated messaging/remote control application module enables a set of application that integrate the operation of instant messaging and remote control of audio/visual devices, such as televisions, computers, radios and other devices. Additionally, the integrated messaging/remote control application module includes features that enable seamless transitions between an instant messaging remote control and a personal computer for carrying on one or more instant messaging sessions.

25 Claims, 12 Drawing Sheets

(56) References Cited

U.S. PATENT DOCUMENTS

| | | | |
|---|---|---|---|
| 2006/0190543 A1* | 8/2006 | Pulver et al. | 709/206 |
| 2006/0218580 A1 | 9/2006 | William | |
| 2006/0271960 A1* | 11/2006 | Jacoby et al. | 725/46 |
| 2006/0271968 A1* | 11/2006 | Zellner | 725/81 |
| 2006/0271997 A1* | 11/2006 | Jacoby et al. | 725/135 |
| 2007/0192410 A1* | 8/2007 | Liversidge et al. | 709/204 |
| 2011/0047487 A1* | 2/2011 | Deweese et al. | 715/758 |

FOREIGN PATENT DOCUMENTS

| | | |
|---|---|---|
| JP | 2001-333411 A | 11/2001 |
| WO | 00/13416 A1 | 3/2000 |
| WO | WO 02/087240 A1 | 10/2002 |
| WO | 03/047257 A1 | 6/2003 |
| WO | 2005/013617 A1 | 2/2005 |
| WO | 2006/022769 A1 | 3/2006 |

OTHER PUBLICATIONS

Supplementary European Search Report for EP 07 86 3021, dated Aug. 26, 2010, 13 pages.

Office Action for Chinese Application No. 200780047017.0, dated Sep. 2, 2010, 11 pages.

The Written Opinion of the International Searching Authority for International Patent Application No. PCT/US2007/025782, Commissioner for Patents, United States, mailed on Apr. 17, 2008.

Office Action received for Chinese Patent Application No. 200780047017.0, mailed on Apr. 18, 2013, 13 pages of Chinese Office action and 11 Pages of English translation.

Office Action received for Japanese Patent Application No. 2009-542846, mailed on May 2, 2013, 3 pages of Japanese Office Action and 4 Pages of English translation.

Examination Notification Art. 94(3) received for European Patent Application No. 07863021.7, mailed on May 6, 2013, 5 pages.

Mikio Hasegawa, English language abstract of "sabisu mobility proxy no sekkei to jissou (Design and Implementation of Service Mobility Proxy)", Jouhou Shorigakkai Kenkyuu Houkoku (IPSJ SIG Notes, vol. 2003 No. 21), Japan, Information Processing Society of Japan, Mar. 7, 2003, vol. 2003, 1 page.

Extended European Search Report received for European Patent Application No. 13164563.2, mailed on Sep. 5, 2013, 8 pages.

Office Action received for Japanese Appl. No. 2009-542846 dated Jan. 30, 2012, English translation, 7 pages.

* cited by examiner

US 8,706,818 B2

REMOTE CONTROL-BASED INSTANT MESSAGING

BACKGROUND OF THE INVENTION

1. Field of the Invention

The present invention relates to instant messaging, and more particularly, to remote control-based instant messaging.

2. Background of Invention

Instant messaging ("IM") provides a form of real-time communications based on text messages exchanged between users. Users can exchange instant messages between computers, cell phones, PDAs and other wired or wireless devices. Instant messaging sessions are almost exclusively carried out by users using either a computer or a cell phone. The text that is exchanged is transmitted over an intermediate network, such as the Internet. When an instant messaging session begins, an end user device is connected to an IM server, either through a wired or wireline connection.

Instant messaging differs from electronic mail ("e-mail") in that conversations occur in real-time. Most instant messaging services offer a presence information feature, indicating whether people on one's list of contacts are currently online and available to chat. This feature enables users to readily ascertain whether a contact is available for an instant messaging session. Instant messaging is widely used and continues to grow in popularity. Common instant messaging services include AOL Instant Messenger, Google Talk, Microsoft Messenger, and Yahoo!Messenger.

Audio/visual remote controls, such as a television remote control are nearly ubiquitous. These remote controls, however, do not support instant messaging, thereby limiting further growth of instant messaging services and limiting desirable user features that integrate instant messaging and audio/video control capabilities.

What is needed is an instant messaging remote control that integrates instant messaging and audio/video control capabilities, and provides the convenience of accessing IM services via remote control.

SUMMARY OF THE INVENTION

The present invention provides systems and methods for an instant messaging remote control. An instant messaging remote control includes an audio/visual remote control, an instant messaging user interface, an instant messaging navigator, a keypad and an integrated messaging/remote control application module. The instant messaging user interface enables a user to view instant messaging status and control instant messaging functions. The instant messaging navigator enables a user to switch between instant messaging sessions. The audio/visual remote control provides remote control for devices, such as a television.

The integrated messaging/remote control application module enables a set of applications that integrate the operation of instant messaging and remote control of audio/visual devices, such as televisions, computers, radios and other devices. These applications include, but are not limited to, exchanging audio/visual programming information among IM users and supporting collaborative voting on activities or content being viewed or accessed.

Additionally, the integrated messaging/remote control application module includes features that enable seamless transitions between an instant messaging remote control and a computer for carrying on one or more instant messaging sessions.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
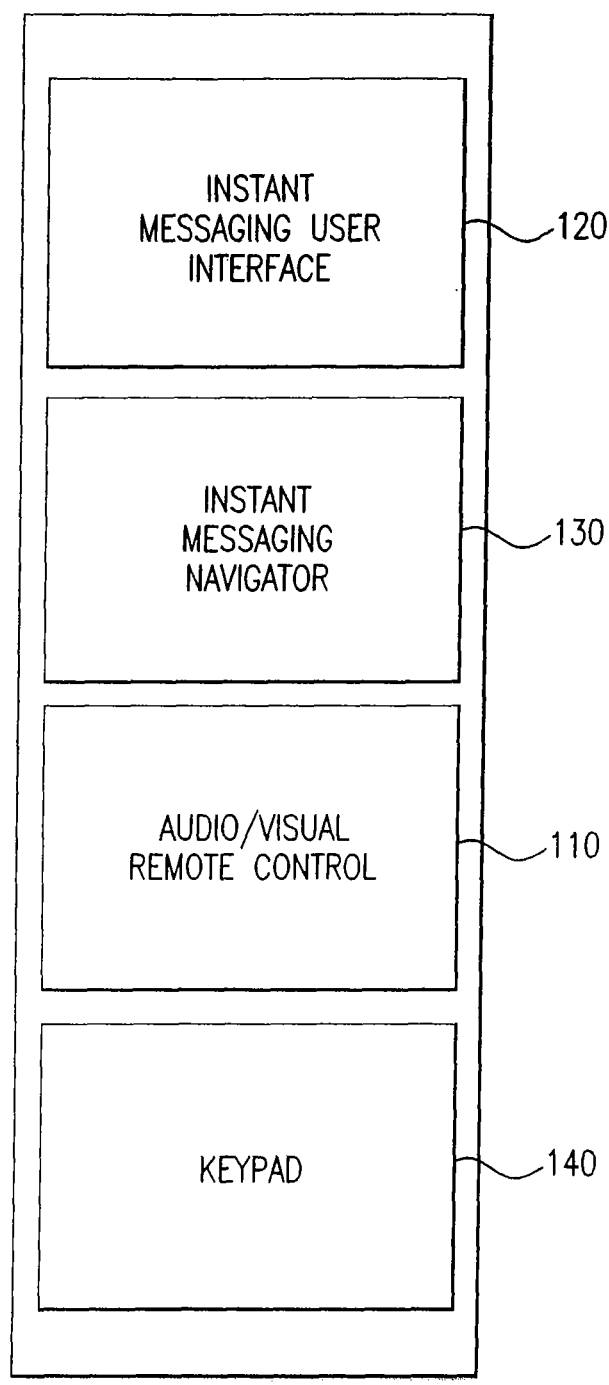
FIG. 1 provides a diagram of an instant messaging remote control, according to an embodiment of the invention.
Figure 1A:
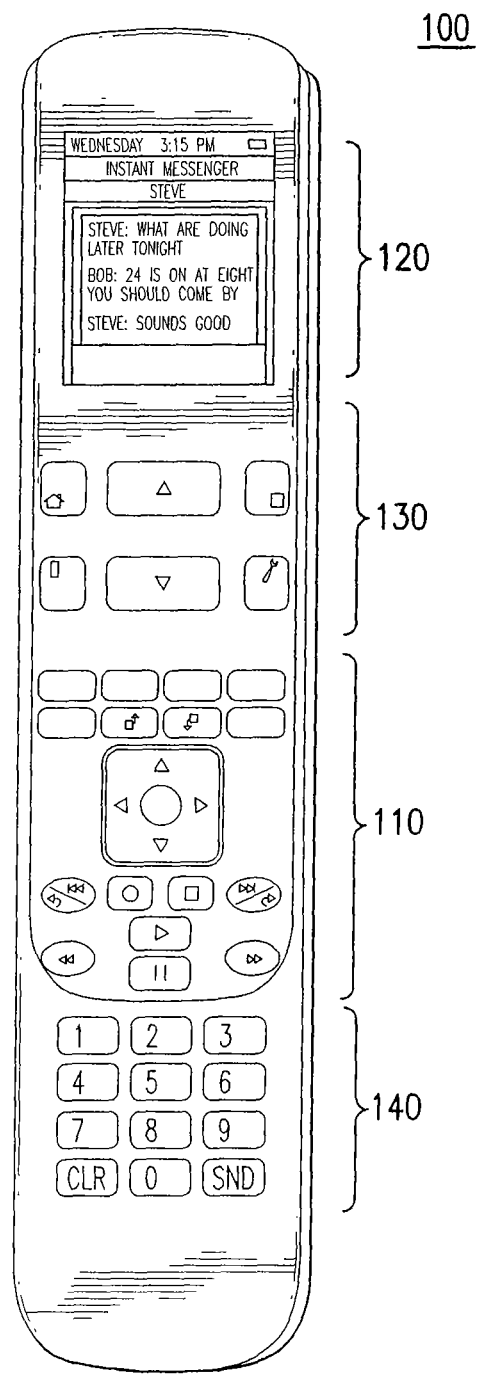
FIG. 1A provides an illustration of an instant messaging remote control, according to an embodiment of the invention.

FIG. 1 provides a diagram of instant messaging remote control 100, according to an embodiment of the invention. Instant messaging remote control 100 includes audio/visual remote control 110, instant messaging user interface 120, instant messaging navigator 130, and keypad 140. FIG. 1A provides an illustration of an embodiment of instant messaging remote control 100, according to an embodiment of the invention. Instant messaging remote control 100 provides one embodiment of the invention for illustration purposes only, and not intended to limit the invention to this single embodiment. As will be known by individuals skilled in the relevant arts, other physical configurations of these components are possible based on the teachings herein. In an alternative embodiment, for example, instant messaging remote control 100 includes only audio/visual remote control 110 and instant messaging user interface 120. In this embodiment, the navigator and keypad functions are provided via soft keys within instant messaging user interface 120. In additional embodiments instant messaging remote control 100 manage IM sessions for a TV, set-top box, audio/visual receiver that presents an on-TV display of the IM session.

Audio/visual remote control 110 controls audio/visual devices, including, but not limited to one or more of a television, audio/video receiver, audio receiver, video receiver, video recorder, or an integrated audio/video device.

Instant messaging user interface 120 provides a graphic user interface displayed on a screen (e.g., a color LCD screen). Instant messaging user interface 120 enables a user to view instant messaging status and control instant messaging functions. Specifically, instant messaging user interface 120 supports a number of IM-based functions, including, but not limited to, notification, directory, summary view, message view/interaction, multiple-session control, and text entry functions. Additionally, in an embodiment instant messaging user interface 120 can display and or preview multimedia content, such as television programming, videos and Internet websites, for example.

With respect to message notification, instant messaging remote control 120 notifies a user that an IM message has been received in a variety of ways. User interface 120 provides a text indication, a notification icon, and/or a button that appears, flashes, or has effects applied to its text, border, or background to notify a user that a message has been received. In another embodiment, a message notifier light emitting diode ("LED") becomes illuminated when a message is received. The message notifier LED can, for example, be located on the top of instant messaging remote control 100. In another embodiment, a sound alert can be provided when a message is received. The sound alert can include, but is not limited to, beeps, melodies, synthesized or sampled voice and the like. In another embodiment glowing or pulsing elements (e.g., a backlight beyond keyboard 140 can blink) can signal that a message has been received.

In yet another embodiment, when instant messaging remote control 100 is being used with a television, a set-top box, audio/visual receiver, or some other device that is responsible for managing video streams and receiving communications from remote control 100, instant messaging remote control 100 can transmit a signal to the television, such that the television can provide an indication that a message has been received. For example, a teletext-like message could be displayed across the bottom of the television or an icon can be displayed indicating that a new message has been received. In an embodiment, this concept is extended, such that an instant messaging session can be carried out using teletext streaming across the television screen. Alternatively, the embodiment can employ a full screen, user interface where screen and menu navigation is handled by remote control 100.

Figure 2:
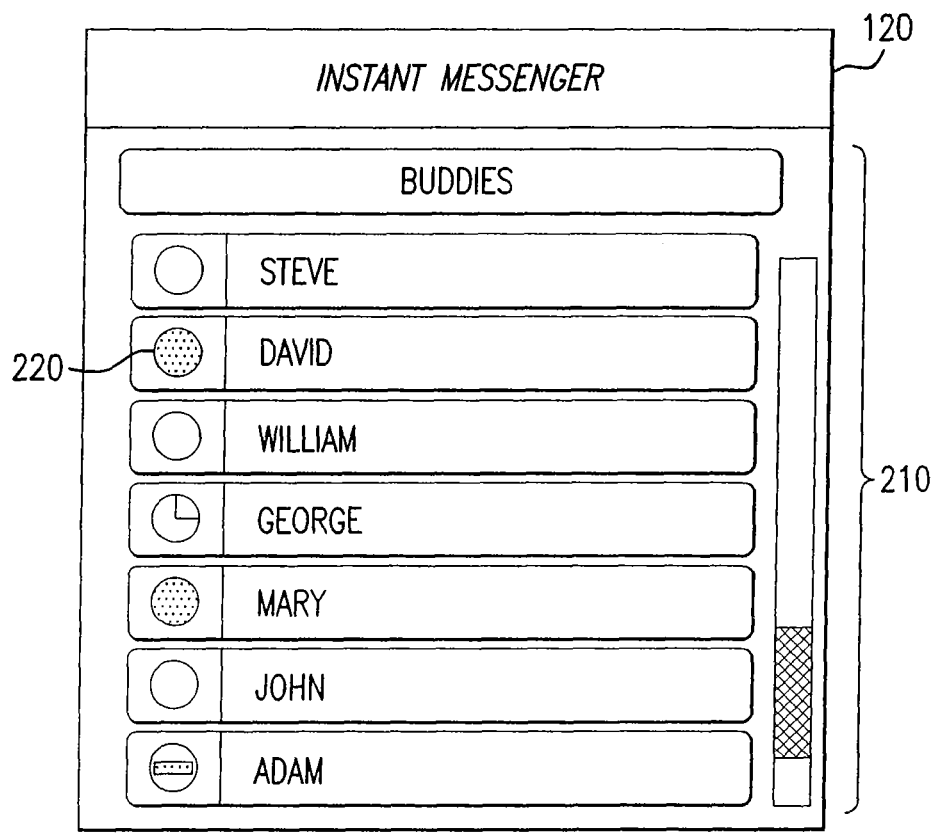
FIG. 2 provides a diagram of an instant messaging user interface directory of IM contacts, according to an embodiment of the invention.

As illustrated in FIG. 2, user interface 120 can also display a complete directory 210 of IM contacts, which is also referred to as a "Buddies List." Each contact name can be annotated with a presence indicator, such as presence indicator 220, (e.g., available/busy/away) to show whether a contact is available for an IM session. The user can use directory 210 to establish a new IM session by selecting an available contact from the list with whom the user wishes to communicate (e.g., scrolling down to the name of the desired contact and selecting that contact with the activation of a select button.)

Figure 3:
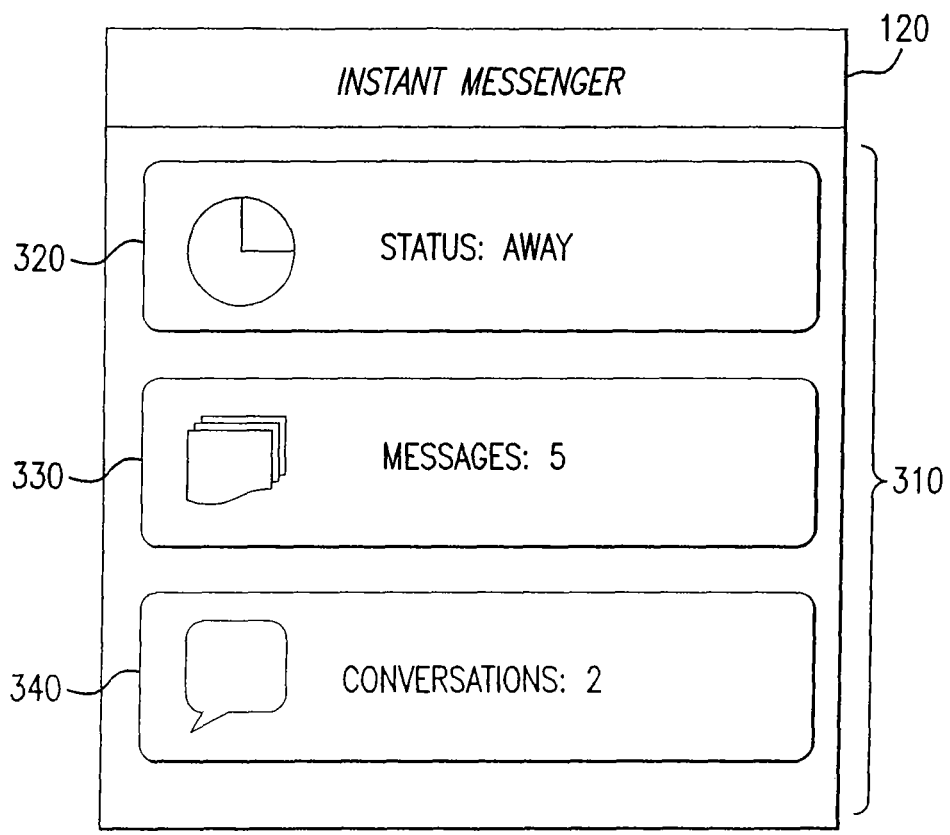
FIG. 3 provides a diagram of an instant messaging user interface summary screen, according to an embodiment of the invention.

User interface 100 can also display a summary screen of the current state of the IM application, such as summary screen 310 illustrated in FIG. 3. Summary screen 310 can serve as a selector for opening a larger view of an application or individual sessions. Summary screen 310 includes status indicator 320, message indicator 330 and conversation indicator 340. To access summary screen 310, a user can activate a physical status key or select a soft button on user interface 100 to view status summary information, such as whether there are active sessions as indicated by status indicator 320, whether new messages have been received since the last time the user was on that message's screen as indicated by message indicator 330, and a count of active sessions or messages as indicated by conversation indicator 340. Other summary information can be provided within summary screen 310.

In an alternative embodiment, the status key or button is not static, but can change color or be associated with some icon that may indicate whether the user has any active IM sessions or a number indicating the number of such sessions.

A user can scroll down summary screen 310 and select any one of indicators 310, 320, and 330 to obtain more detail about a particular information subject. For example, selecting conversation indicator 330 generates another screen that identifies the list of contacts with whom the user is currently conversing.

Since a user can have several concurrent IM sessions, remote control 100 needs to have an instant messaging navigator that provides the user a way to switch between such sessions. One approach to navigating between sessions include right/left (or up/down) navigation, using an instant messaging navigator, such as navigator 130. In this example, pressing a right/left arrows/positions on a D-pad (alternatively, a joystick can be used) can cycle to the next session. In another approach, an on-screen drop-down selector within instant messaging user interface 120 can be used as the navigator. In this approach a small amount of screen real-estate (e.g., one line) can be a selectable region that brings a pull-down menu for selecting another session.

When a larger screen size is used, tab-navigation can be used as the navigator to navigate between sessions. In this case, a user can devote some screen space to presenting a set of tabs that are always visible, with each tab representing a session. The advantage with this method is that a tab can be color coded (or blinking) to indicate new messages for that session and that the session can be directly selected.

Finally, a back-forth navigation approach can be used for the navigator. In this case, a user can back out of the current session and be presented with the overall list of sessions and then select the desired session (or a new one, or exit the IM interface altogether.)

Figure 4:
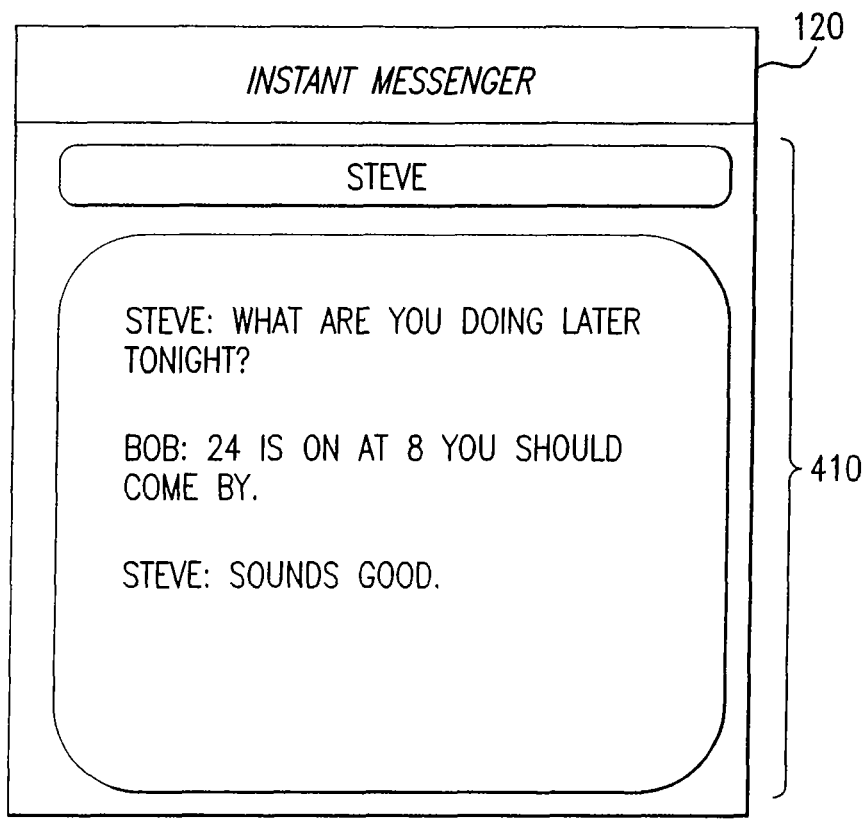
FIG. 4 provides a diagram of an instant messaging user interface displaying an instant messaging stream, according to an embodiment of the invention.

FIG. 4 provides an example instant messaging stream 410 displayed on user interface 120, according to an embodiment of the invention. In alternative embodiments, the message stream can be displayed on a television, a personal computer screen, display tablet and the like. In these alternative embodiments, remote control 100 transmits control and data messages to the display device to be used. The transmitted messages provide formatting information for the display of the instant messaging stream, and transmit the text to be displayed.

Figure 5:
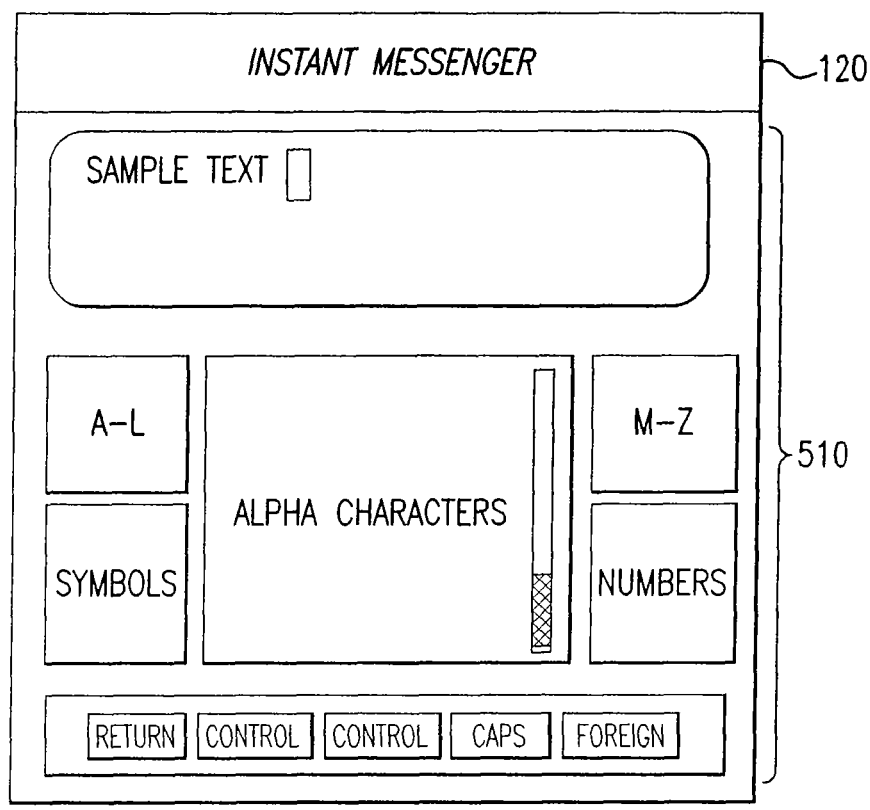
FIG. 5 provides a diagram of an instant messaging user interface displaying a screen based instant messaging navigator, according to an embodiment of the invention.
Figure 6:
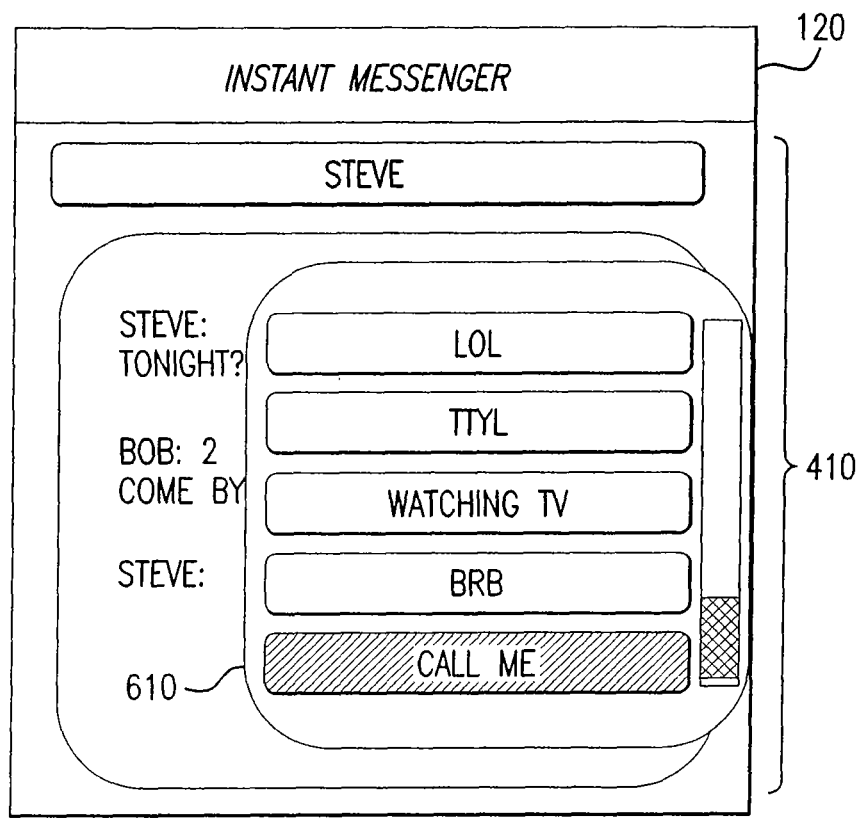
FIG. 6 provides a diagram of an instant messaging user interface displaying a set of preset messages, according to an embodiment of the invention.

When sending text messages, a user will enter messages via a keypad, which can be implemented in a variety of ways. In one embodiment, a numeric keypad (with supplemental keys), such as keypad 140 is used. The numeric keypad includes multi-tap capabilities (e.g., press 8 for 't,' 88 for 'u,' 888 for 'v') and/or predictive text capabilities. In another embodiment, a full alphanumeric keypad can be used. Additionally, a stylus entry of text can be used provided that user interface 120 is a stylus sensitive display. Similarly, touch entry of text can be used, provided that user interface 120 is a touch sensitive display that provides a pop-up keypad or scroll-list of characters to be used. In a final embodiment, FIG. 5 illustrates screen-based navigator 510, in which a user can use arrow keys or a D-pad to select characters from a pop-up menu. Each of the embodiments described above can also be augmented with preset messages (e.g., system-provided or user-entered a priori), such as preset messages 610 shown in FIG. 6. In this case, a user would select a set of pre-set messages to form an instant message.

Figure 8:
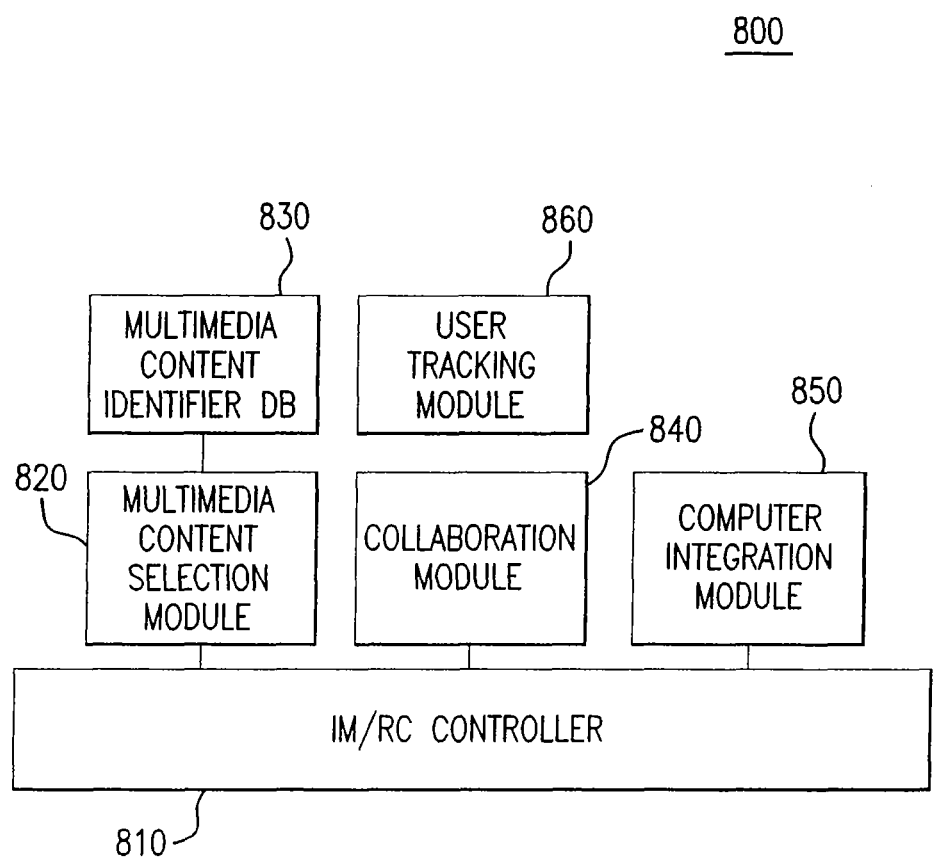
FIG. 8 is a diagram of an integrated messaging/remote control application module, according to an embodiment of the invention.

According to an embodiment, the functionality of instant messaging remote control 100 is controlled by an integrated messaging/remote control application module. FIG. 8 provides a block diagram of integrated messaging/remote control ("IM/RC") application module 800, according to an embodiment of the invention. IM/RC application module 800 includes IM/RC controller 810. In an embodiment, IM/RC application module 800 is embodied in a computer readable medium. IM/RC controller 810 provides the functionality for remote control 100 to serve as an instant messaging device integrated with the functionality of a remote control device. In other embodiments, IM/RC controller 810 can include one or more of multimedia content selection module 820, multimedia content identifier database 830, collaboration module 840, computer integration module 850 and user tracking module 860. In further embodiments, IM/RC application module 800 can include other application modules, such as for example, a telephony integration module that allows a telephone call to be placed directly based on a telephone reference in an IM message.

Alternatively, the instant messaging and remote control functionalities are each controlled by separate modules. Accordingly, the module controlling instant messaging functionality may be physically located in a system (e.g., a personal computer or set-top box) that is remote and/or separate from the module controlling remote control functionality.

Multimedia content selection module 820 enables an instant messaging remote control, such as remote control 100, to access content on an audio/visual device that is referenced in an instant message. Multimedia content identifier database 830 is coupled to multimedia content selection module 820 and provides identifier information for content, such as electronic program guide codes for television shows. Multimedia content identifier database 830 includes stored identifier information and can gather identifier information by transmitting messages to information sources, such as a computer or cable set top box. Alternatively, an IM message may simply contain a channel number to which the TV (or set-top box) is directly tuned without correlation to a database.

Collaboration module 840 enables an instant messaging remote control, such as remote control 110, to determine group ratings based on instant messages exchanged among users. Computer integration module 850 enables an instant messaging remote control, such as remote control 100, to transfer seamlessly an instant messaging session between the instant messaging remote control and a computer. User tracking module 860 enables an instant messaging remote control, such as remote control 100, to track user's activity including for example, who they have had instant message sessions with, the video or other multimedia content that they have recently viewed, and their list of preferred video or other types of multimedia content.

IM/RC application module 800 enables a plethora of integrated instant messaging and remote control applications. Examples of these are discussed below. In addition to portability and the convenience of not needing to be seated in front of a computer or using a cell phone, another important feature of remote control 100 is that it allows the user to share programming information for multimedia content with other IM contacts. In an embodiment, multimedia content selection module 820 enables the exchange of information among IM users for selecting and displaying programming from a variety of multimedia content sources, such as cable, satellite and broadcast television, for example. Multimedia content may also be referred to as audio/visual content or programming and includes, but is not limited to, television programs, radio broadcasts, videos, podcasts, music or videos saved on a portable music player, such as an Apple IPOD, Internet website, intranet website, and RSS news items.

While composing a message in an IM session, a user can send information relating to the current TV show (or other media being accessed by the user) that the user is viewing to another IM user. The user selects this information from a pop-up menu that includes a list of content from recent activities (as explained below, this can include the current TV show being viewed, a list of last-selected Internet radio stations, and/or lists of other Internet-accessible content, etc.).

Specifically, remote control 100 keeps track of the user's activities, for example, within user tracking module 860, which may include the current TV/cable/satellite channel selected by the user or the current Internet/Intranet content being streamed. TV programming or channel information can include a unique program ID (obtained from an electronic program guide ("EPG")) that can be correlated with the program guide on the other user's remote control so that the appropriate channel can be selected. When EPG information is not available, station call letters or a program name can be used.

Figure 7:
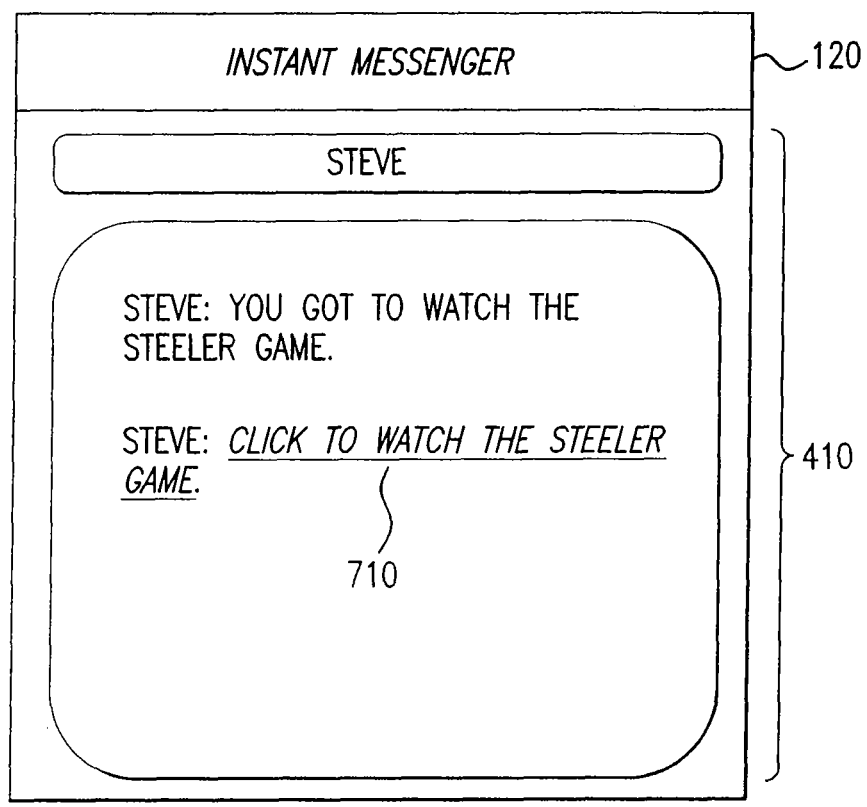
FIG. 7 provides a diagram of an instant messaging user interface displaying a content reference that has been highlighted for selection, according to an embodiment of the invention.

The receiver of the IM message will see the program text appear as a button or link that can be navigated to and selected, which is illustrated in FIG. 7. Selecting this button or link will enable a user to access the selected media within the context of that user's particular device configuration.

For example, if the user selects a "Click to Change Channels" link received via an IM message, remote control 100 will convert the link into the control commands necessary to tune the user's particular TV to the designated TV channel.

Since an instant message is composed only of text, the button or link is parsed as tagged text in the message, in much the same way that emoticons are parsed by IM software (e.g., a :) sequence gets translated to a ☺ ). In the case of sending a channel selector, the sequence can be escaped with something such as:

<control activity=tv program_id=947893/> or, to create something similar to linked text (text in a button):

<control activity=tv program_id=947893>Check this out!
</activity>

There is no particular need to use XML since the rest of the message is not structured. Any other escape format is equally suitable. Preferably, there is an advantage for the tag to be humanly readable since it will be displayed in its raw form to users who do not use a remote control capable of this feature (e.g., users on a computer).

This same control mechanism can be used to transmit a link to a podcast, RSS news item, Internet ratio station, and the like. For example an instant message can be sent that reads:

You might enjoy this discussion <control activity=inet_audio
link="http://www.audiofiles.com/samplefile.mp3" />

Figure 9:
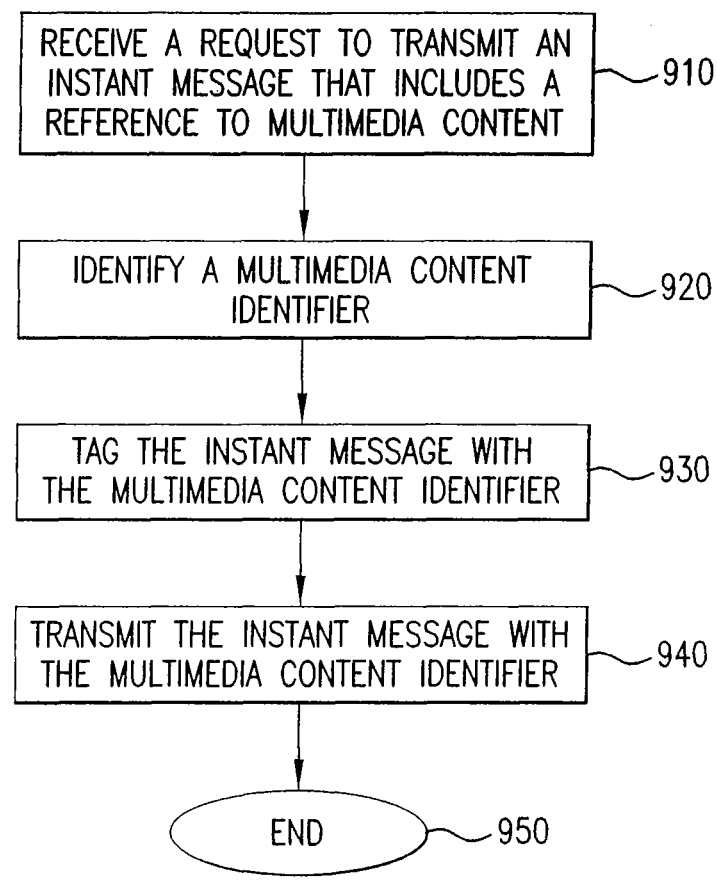
FIG. 9 is a flowchart of a method for exchanging multimedia content within an instant messaging session from the perspective of a sending user, according to an embodiment of the invention.
Figure 10:
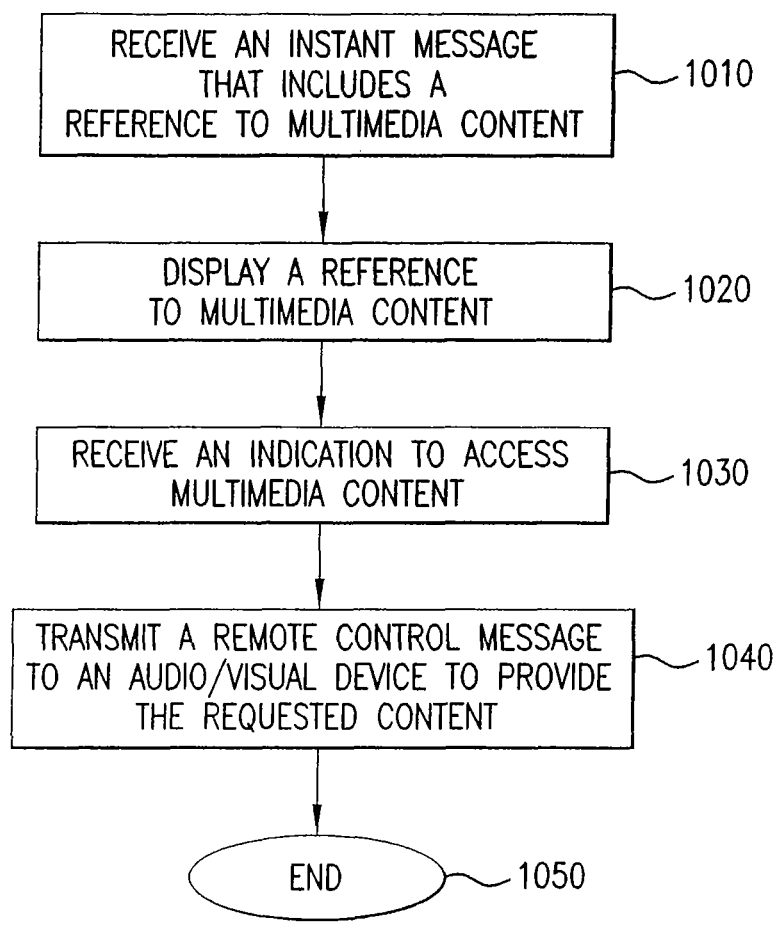
FIG. 10 is a flowchart of a method for exchanging multimedia content within an instant messaging session from the perspective of a receiving user, according to an embodiment of the invention.

FIGS. 9 and 10 provide flowcharts of method 900 and 1000 that illustrate the method for exchanging multimedia content within an instant message from the perspective of the originating and receiving users, respectively. Referring to FIG. 9, method 900 begins in step 910.

In step 910 a request to transmit an instant message that includes a reference to multimedia content is received. For example, a user could request that an instant message remote control, such as remote control 10, transmit a reference to a television show that the user is currently viewing.

In step 920 a multimedia content identifier is identified. For example, remote control 110 could access multimedia content identifier database to retrieve an EPG code for the television show. Alternatively, remote control 110 could transmit a message to a cable set top box, DVD player or other device to determine an identifier for the multimedia content.

In step 930 an instant message to be sent is tagged with the multimedia identifier. For example, the instant message could be tagged as
<control activity=tv program_id=947893> Check this out! </activity>

In step 940 the instant message with the tag reference to the multimedia content is transmitted. For example, remote control 110 could transmit the message to an IM server, so that the message is routed to the appropriate user. In step 950, method 900 ends.

Referring to FIG. 10, on the receiving side, method 1000 depicts the process of a remote control, such as remote control 100 receiving the instant message with a tagged multimedia content reference. Method 1000 begins in step 1010.

In step 1010 an instant message that includes a reference to multimedia content is received. For example, a remote control, such as remote control 100 can receive a message with a tagged reference to a television show.

In step 1020, the reference to the multimedia content is displayed. For example, referring to FIG. 7, the message 710 could be displayed.

In step 1030, an indication to access the multimedia content displayed in step 1020 is received. For example, a user could hit a soft key corresponding to the link, or could tab on a touch screen where the link is highlighted. displaying the reference to multimedia content;

In step 1040, a remote control message is transmitted to a multimedia device to provide the requested multimedia content. For example, multimedia content selection module 820 can determine what device needs to be accessed, and then request that IM/RC controller 810 communicate with audio/visual remote control 110 to transmit the appropriate remote control message to the device to access the desired multimedia content. In step 1050, method 1000 ends.

The concept of escaped codes in a message stream can also be used for applications beyond device control and content sharing and include collaborative services. For example, messaging software, such as IM/RC application module 800, within remote control 100 can support an election mechanism that can be used for group ratings or voting on what to do.

In this case, the originating software will send a tag that is embedded in the message and expanded to, for example, a "thumbs up" and "thumbs down" set of icons or a list pop-up menu offering a list of options. The user's selection will result in a reply tagged message that the originator will parse as a response and modify the requisite parameters (e.g., Thumbs-up count and Thumbs-down count). Results can be propagated as tags to the users so everyone can see aggregate statistics.

Figure 11:
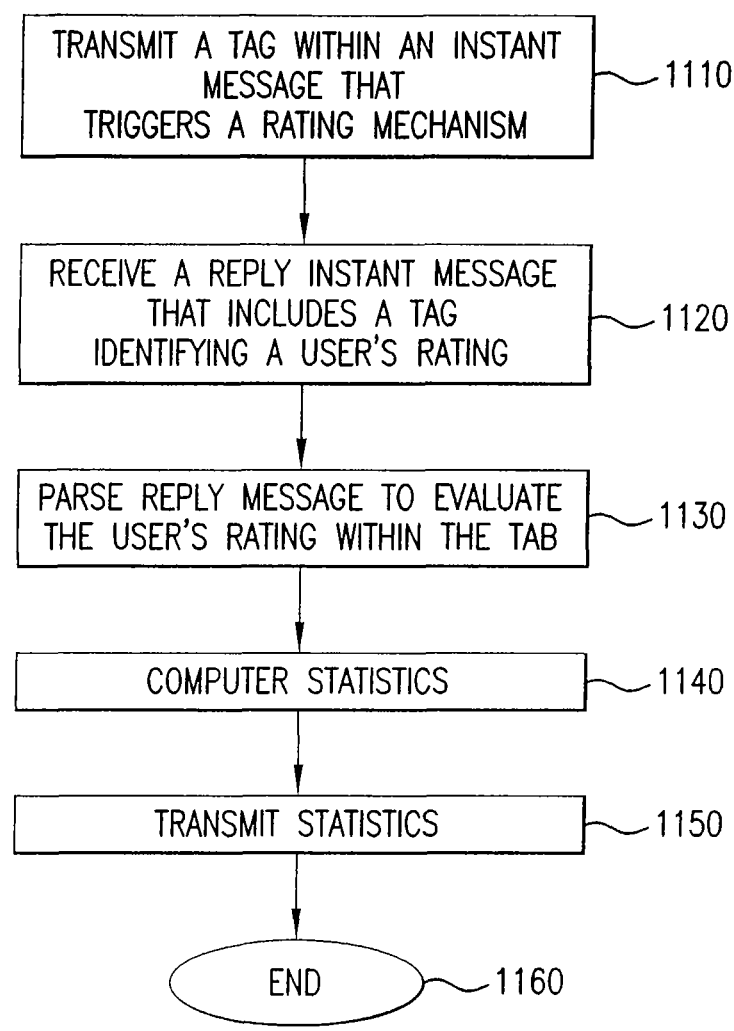
FIG. 11 is a flowchart of a method for providing group ratings within an instant messaging session, according to an embodiment of the invention.

FIG. 11 provides a flowchart of a method 1100 for providing group ratings within an instant messaging session, according to an embodiment of the invention. Method 1100 begins in step 1110.

In step 1110 a tag within an instant message that triggers a receiving device to display a rating mechanism is transmitted. In step 1120 a reply instant message that includes a tag that identifies a user's rating is received. In step 1130 the received reply instant message is parsed to evaluate the user's rating within the tag. In step 1140 statistics for ratings received from multiple users are computed. In an optional step 1150 the rating statistics are transmitted to the instant messaging users that participate in the rating exercise. In step 1160 method 1100 ends.

Tagged messaging can also be used to facilitate phone calls if the remote control has telephony capabilities. For example, the standard "Call Me" message can be provided with control tags so that the message appears to the receiver as a selectable link for placing a phone call to the sender:
<control activity-phone n=2125551212> Please call me </control>

If the sender's remote is not telephone capable, the sender can simply present a number of a phone to which the receiver can dial to reach the sender. Additionally, with some IP phone services (such as Vonage), the receiver can contact the service provider to dial the messaged number and ring the sender's phone.

The foregoing description has focused on remote control 100 serving as the primary instant messaging client in a home. Alternatively, a personal computer can serve as a proxy to an instant messaging remote control. In this embodiment, the computer establishes and maintains the connection to the remote IM server (via the Internet) and runs the messaging client software. As the messaging proxy, the computer receives all communication from the IM server and relays messages and commands/directives (such as "disconnect" or "new session") to the instant messaging remote control. The user accomplishes this by switching the IM application on the instant messaging remote control to a mode where it is no longer the proxy, but just a messaging client.

Because the computer is keeping track of the messaging sessions, the user can, at any point in time, switch from using the instant messaging remote control to using the PC for communication (with its larger screen and full keyboard) and then switch back to using the instant messaging remote control. Using this approach, sessions do not have to be reestablished and no new connections have to be created to the IM server.

A variation of the proxy concept mentioned above is to use the instant messaging remote control as the internet-based client and have it serve as a proxy to a personal computer or other device. In this embodiment, the instant messaging remote control establishes the connection to the remote IM server.

If the user of an instant messaging remote control desires to switch and continue the session on a computer, the user can download an applet that will relay all commands and messages from the instant messaging remote control to the computer. All messages and directives will then flow to the computer. Thus, the same flexibility is available to the user as in the above-described embodiment. That is, a user can switch back and forth between a computer and an instant messaging remote control at any time without losing sessions or being required to reestablish a connection with the IM server.

Conclusion

Exemplary embodiments of the present invention have been presented.

The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. An instant messaging remote control, comprising:
    an instant messaging user interface that is configured to:
        display at least one of (a) a status indicator listing active and inactive sessions of a user, (b) a message indicator listing new messages that have been received by the user, or (c) a conversation indicator listing a count of active sessions or messages of the user, the count being an alphanumeric representation of a number of active sessions or messages;
        receive a new message that includes a reference to audio/visual or programming content;
        display the reference to the audio/visual or programming content; and
        receive a request to access the audio/visual or programming content, the request including a received program code, the received program code indicating a first source of the audio/visual or programming content and being associated with a first program guide of the first source; and
    an audio/visual remote control coupled to the instant messaging user interface that is configured to:
        correlate the received program code to a local program code, the local program code indicating a second source of the audio/visual or programming content and being associated with a second program guide of the second source;
        insert the local program code in a remote control message; and
        transmit the remote control message to an audio/visual or programming device to provide the requested audio/visual or programming content.

2. The instant messaging remote control of claim 1, further comprising an instant messaging navigator that allows the user to switch between instant messaging sessions.

3. The instant messaging remote control of claim 1, further comprising a keypad.

4. The instant messaging remote control of claim 1, wherein the audio/visual remote control controls an audio/visual device, wherein the audio/visual device includes a television, audio/video receiver, audio receiver, video receiver, or video recorder.

5. The instant messaging remote control of claim 1, further comprising a message notifier.

6. The instant messaging remote control of claim 5, wherein the message notifier includes one or more of a light emitting diode, a tone generator, pulsing elements or a notification icon.

7. The instant messaging remote control of claim 1, wherein upon receipt of a new instant message, the instant messaging remote control transmits a control message to a receiver causing a video display to display either text that a message has been received or a notification icon.

8. The instant messaging remote control of claim 1, wherein the instant messaging remote control includes a capability to be wirelessly coupled to a video display that displays an instant messaging session.

9. The instant messaging remote control of claim 8, wherein the video display is a television or computer terminal.

10. The instant messaging remote control of claim 1, wherein the instant messaging user interface is also configured to display an audio/visual content link received from a remote instant message user.

11. The instant messaging remote control of claim 10, wherein upon the user clicking on the audio/visual content link the instant messaging remote control transmits a message to an audio/visual device to select the desired audio/visual content.

12. The instant messaging remote control of claim 11, wherein the audio/visual content includes a television program, an Internet website, an intranet website, a radio station, a podcast, a RSS news item, or a portable music player selection.

13. The instant messaging remote control of claim 1, further comprising a messaging client that allows the instant messaging remote control to maintain a connection with a computer that establishes a connection with a remote instant messaging server, wherein the computer serves as a proxy to the instant messaging remote control.

14. The instant messaging remote control of claim 1, further comprising a means for providing a remote computing device with an instant messaging interface, wherein the remote computing device is configured to include an instant messaging control module to provide instant messaging functionality.

15. The instant messaging remote control of claim 1, wherein the instant messaging user interface is configured to display, at the same time, (a) the status indicator listing active and inactive sessions of the user, (b) the message indicator listing new messages that have been received by the user, and (c) the conversation indicator listing a count of active sessions or messages of the user.

16. A system, comprising:
    an instant messaging/remote control controller configured to integrate functionality of an instant messaging device and a remote control, and further configured to:
        receive a new message that includes a reference to audio/visual or programming content;
        display the reference to the audio/visual or programming content;
        receive a request to access the audio/visual or programming content, the request including a received program code, the received program code indicating a first source of the audio/visual or programming content and being associated with a first program guide of the first source;
        correlate the received program code to a local program code, the local program code indicating a second source of the audio/visual or programming content and being associated with a second program guide of the second source;
        insert the local program code in a remote control message; and
        transmit the remote control message to an audio/visual or programming device to provide the requested audio/visual or programming content; and
    a display configured to display at least one of (a) a status indicator listing active and inactive sessions of a user, (b) a message indicator listing new messages that have been received by the user, or (c) a conversation indicator listing a count of active sessions or messages of the user, the count being an alphanumeric representation of a number of active sessions or messages.

17. The system of claim 16, further comprising a multimedia content selector that allows an instant messaging remote control to access content on an audio/visual device that is referenced in an instant message.

18. The system of claim 16, further comprising a collaborator that allows an instant messaging remote control to determine group ratings based on instant messages exchanged among users.

19. The system of claim 16, further comprising a computer integrator that is configured to allow an instant messaging remote control to seamless transfer an instant messaging session between the instant messaging remote control and a computer.

20. The system of claim 16, further comprising a means for providing a remote computing device with an instant messaging interface, wherein the remote computing device is configured to include an instant messaging control module to provide instant messaging functionality.

21. The system of claim 16, wherein the display is configured to display, at the same time, (a) the status indicator listing active and inactive sessions of the user, (b) the message indicator listing new messages that have been received by the user, and (c) the conversation indicator listing a count of active sessions or messages of the user.

22. A method, comprising:
  receiving, using a computing device that is configured to integrate functionality of an instant messaging device and a remote control, an instant message that includes a reference to audio/visual or programming content, wherein the audio/visual or programming content includes one or more of television shows, movies, websites or entertainment programming guides;
  displaying, using the computing device, the reference to the audio/visual or programming content;
  receiving, using the computing device, a request to access the audio/visual or programming content, the request including a received program code, the received program code indicating a first source of the audio/visual or programming content and being associated with a first program guide of the first source;
  correlating the received program code to a local program code, the local program code indicating a second source of the audio/visual or programming content and being associated with a second program guide of the second source;
  inserting the local program code in a remote control message; and
  transmitting, using the computing device, the remote control message to an audio/visual or programming device to provide the requested audio/visual or programming content.

23. A method for generating rating statistics among a group of users using instant messaging, comprising:
  transmitting, using a computing device that is configured to integrate functionality of an instant messaging device and a remote control, a tag within an instant message that triggers a receiving device to display a rating mechanism upon receipt of the instant message;
  receiving, using the computing device, a reply instant message that includes a tag that identifies a user's rating;
  parsing, using the computing device, the received reply instant message to evaluate the user's rating within the tag;
  computing, using the computing device, statistics for ratings received from multiple users within the group of users using the instant messaging; and
  transmitting, by the computing device, the computed statistics to each of the multiple users within the group of users using the instant messaging in response to completing the computing.

24. A method for generating voting statistics among a group of users using instant messaging, comprising:
  transmitting, using a computing device that is configured to integrate functionality of an instant messaging device and a remote control, a tag within an instant message that triggers a receiving device to display a voting mechanism;
  receiving, using the computing device, a reply instant message that includes a tag that identifies a user's voting;
  parsing, using the computing device, the received reply instant message to evaluate the user's voting within the tag;
  computing, using the computing device, statistics for votes received from multiple users within the group of users using instant messaging; and
  transmitting, by the computing device, the computed statistics to each of the multiple users within the group of users using the instant messaging in response to completing the computing.

25. The method of claim 24, further comprising:

receiving a new instant message; and in response to receiving the new instant message, transmitting a control message to a receiver causing a video display to display at least one of text indicating that the new instant message has been received or a notification icon indicating that the new instant message has been received.

* * * * *